United States Patent
Fraser et al.

(10) Patent No.: US 10,491,067 B2
(45) Date of Patent: Nov. 26, 2019

(54) ROTOR FOR AN ELECTRIC MOTOR OR GENERATOR

(71) Applicant: PROTEAN ELECTRIC LIMITED, Surrey (GB)

(72) Inventors: Alexander George Fraser, Hants (GB); Dragica Kostic Perovic, Surrey (GB); Gunaratnam Sooriyakumar, Surrey (GB); Barrie Charles Mecrow, Newcastle Upon Tyne (GB); Nicholas Jon Baker, Newcastle Upon Tyne (GB); Sichao Yang, Newcastle Upon Tyne (GB)

(73) Assignee: PROTEAN ELECTRIC LIMITED, Surrey (GB)

( * ) Notice: Subject to any disclaimer, the term of this patent is extended or adjusted under 35 U.S.C. 154(b) by 247 days.

(21) Appl. No.: 15/110,403

(22) PCT Filed: Dec. 19, 2014

(86) PCT No.: PCT/IB2014/067124
§ 371 (c)(1),
(2) Date: Jul. 7, 2016

(87) PCT Pub. No.: WO2015/104611
PCT Pub. Date: Jul. 16, 2015

(65) Prior Publication Data
US 2016/0344246 A1   Nov. 24, 2016

(30) Foreign Application Priority Data

Jan. 8, 2014 (GB) .................................. 1400297.6

(51) Int. Cl.
*H02K 1/27* (2006.01)
*H02K 7/14* (2006.01)
(Continued)

(52) U.S. Cl.
CPC ............ *H02K 1/2786* (2013.01); *B60L 15/20* (2013.01); *B60L 50/51* (2019.02); *H02K 7/14* (2013.01);
(Continued)

(58) Field of Classification Search
CPC .. B60L 11/1803; B60L 15/20; B60L 2220/14; B60L 2220/44; B60L 2220/50;
(Continued)

(56) References Cited

U.S. PATENT DOCUMENTS 4,689,973 A * 9/1987 Hershberger ......... D06F 37/304
68/23.7
4,700,096 A * 10/1987 Epars ................... H02K 1/2773
310/153

(Continued)

FOREIGN PATENT DOCUMENTS

EP 1536543 A1 6/2005
EP 2645536 A1 10/2013
(Continued)

OTHER PUBLICATIONS

European Patent Office; International Search Report; dated Sep. 29, 2015; WIPO; Rijswijk.
(Continued)

*Primary Examiner* — Mang Tin Bik Lian
*Assistant Examiner* — Ahmed Elnakib
(74) *Attorney, Agent, or Firm* — Nolte Intellectual Property Law Group

(57) ABSTRACT

A radial portion of a rotor is rotatably mounted to a stator and a cylindrical portion axially extends over radial teeth formed on the stator. A first surface of the first soft ferromagnetic material element is mounted to an inner surface of the cylindrical portion and a second surface of the first soft ferromagnetic material element has mounted on it a first (Continued)

magnet such that a surface of a pole of the first magnet is oriented substantially non perpendicular to a line from the centre of the rotor to the first magnet. A first surface of a second soft ferromagnetic material element is mounted to the first magnet such that the first magnet is sandwiched between the first and second soft ferromagnetic material elements. A second surface of the second soft ferromagnetic material element is substantially perpendicular to the line from the centre of the rotor to the first magnet.

12 Claims, 4 Drawing Sheets

(51) Int. Cl.
  B60L 15/20 (2006.01)
  B60L 50/51 (2019.01)
(52) U.S. Cl.
  CPC ....... *B60L 2220/14* (2013.01); *B60L 2220/44* (2013.01); *B60L 2220/50* (2013.01); *B60L 2240/423* (2013.01); *B60L 2240/425* (2013.01); *H02K 1/2766* (2013.01); *Y02T 10/641* (2013.01); *Y02T 10/645* (2013.01); *Y02T 10/7005* (2013.01); *Y02T 10/72* (2013.01); *Y02T 10/7275* (2013.01)
(58) Field of Classification Search
  CPC ......... B60L 2240/423; B60L 2240/425; H02K 1/2786; H02K 7/14; H02K 1/2766; Y02T 10/641; Y02T 10/645; Y02T 10/7005; Y02T 10/72; Y02T 10/7275
  USPC ......................................... 310/156.08, 156.21
  See application file for complete search history.

(56) References Cited

U.S. PATENT DOCUMENTS

| | | | | |
|---|---|---|---|---|
| 6,144,132 A * | 11/2000 | Nashiki | ................ | H02K 1/2713 310/152 |
| 6,323,572 B1 * | 11/2001 | Kinoshita | ............ | H02K 1/2766 310/156.07 |
| 7,262,526 B2 * | 8/2007 | Shiga | ................... | H02K 1/2786 310/156.28 |
| 7,388,310 B2 * | 6/2008 | Abou-Akar | .......... | H02K 1/2773 310/156.48 |
| 8,138,650 B2 * | 3/2012 | Shiga | ................... | H02K 1/2786 29/596 |
| 9,088,190 B2 * | 7/2015 | Trennelling | ......... | H02K 1/2766 |
| 2001/0042983 A1 * | 11/2001 | Kinoshita | ............ | H02K 1/2786 290/44 |
| 2003/0173853 A1 * | 9/2003 | Knauff | ................. | H02K 1/2773 310/156.56 |
| 2004/0217666 A1 * | 11/2004 | Mellor | ................... | H02K 1/276 310/156.53 |
| 2005/0231057 A1 * | 10/2005 | Kloepzig | ............. | H02K 1/2733 310/156.56 |
| 2006/0103253 A1 * | 5/2006 | Shiga | ................... | H02K 1/2786 310/156.45 |
| 2006/0108887 A1 * | 5/2006 | Nitta | ..................... | D06F 37/304 310/156.53 |
| 2007/0228858 A1 * | 10/2007 | Malmberg | .......... | H02K 1/2766 310/156.01 |
| 2010/0259112 A1 * | 10/2010 | Chung | .................. | H02K 16/00 310/12.18 |
| 2012/0228965 A1 * | 9/2012 | Bang | ....................... | F03D 9/002 310/12.18 |
| 2012/0262019 A1 * | 10/2012 | Smith | .................. | H02K 1/2766 310/156.07 |
| 2012/0326545 A1 * | 12/2012 | Stiesdal | ................ | H02K 1/278 310/152 |
| 2013/0342067 A1 * | 12/2013 | Jang | .................... | H02K 1/2786 310/156.38 |
| 2015/0028710 A1 * | 1/2015 | Oka | ..................... | H02K 1/2773 310/156.48 |
| 2015/0042099 A1 * | 2/2015 | Muniz Casais | ...... | H02K 1/2773 290/55 |
| 2015/0048620 A1 * | 2/2015 | Muniz Casais | ...... | H02K 1/2773 290/55 |
| 2016/0226326 A1 * | 8/2016 | Gotschmann | ........ | H02K 1/2746 |
| 2016/0344246 A1 * | 11/2016 | Fraser | .................... | B60L 50/51 |

FOREIGN PATENT DOCUMENTS

| | | |
|---|---|---|
| GB | 2392315 A | 5/2002 |
| WO | 2005117235 A1 | 12/2005 |
| WO | 2008148398 A1 | 12/2008 |
| WO | WO2008148398 * | 12/2008 |
| WO | 2009092384 A1 | 7/2009 |
| WO | 2013058100 A1 | 4/2013 |
| WO | 2013144287 A2 | 10/2013 |

OTHER PUBLICATIONS

European Patent Office; Written Opinion of the International Searching Authority; dated Sep. 29, 2015; WIPO; Rijswijk.
Intellectual Property Office; Combined Search and Exam Report; dated Mar. 7, 2014; IPO; United Kingdom.
Intellectual Property Office; Search Report First; dated Mar. 6, 2014; IPO; United Kingdom.

* cited by examiner

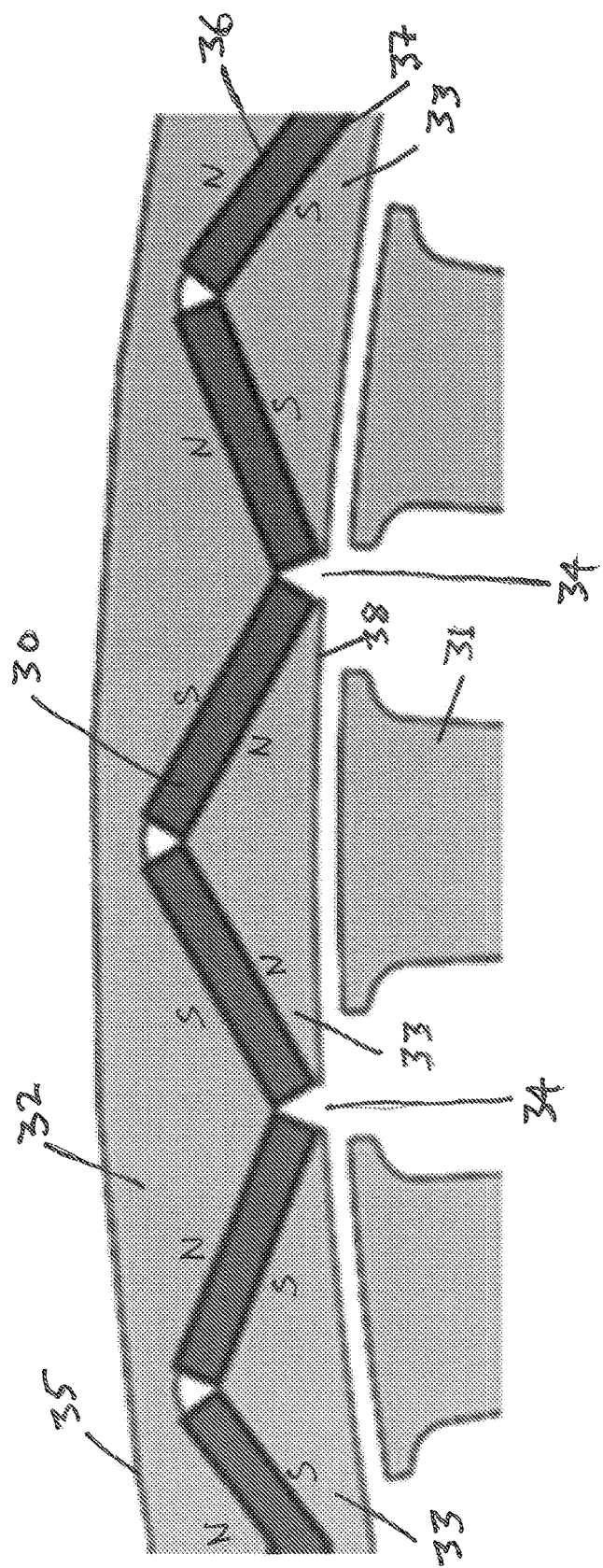

ROTOR FOR AN ELECTRIC MOTOR OR GENERATOR

The present invention relates to a rotor, in particular a rotor for an electric motor or generator.

Electric motors work on the principle that a current carrying wire will experience a force when in the presence of a magnetic field. When the current carrying wire is placed perpendicular to the magnetic field the force on the current carrying wire is proportional to the flux density of the magnetic field. Typically, in an electric motor the force on a current carrying wire is formed as a rotational torque.

Examples of known types of electric motor include the induction motor, brushless permanent magnet motor, switched reluctance motor and synchronous slip ring motor, which have a rotor and a stator, as is well known to a person skilled in the art.

As the force on the current carrying wire, and consequently the torque for an electric motor, is proportional to the flux density of a magnetic field it is desirable for a synchronous permanent magnet traction motor, where torque is an important criterion for the motor, to use magnets with as high a flux density as possible.

Consequently, rare earth magnets, which produce significantly stronger magnetic fields than other types of magnets, are commonly used within synchronous permanent magnet electric motors. However, the cost of rare earth magnets can be relatively high, which has resulted in electric motor solutions being proposed to enhance the magnetic properties of rare earth magnets within an electric motor rotor design, thereby allowing smaller rare earth magnets to be used for a given flux density.

One proposal that has been adopted within electric motors having an inner rotor has been a V shape magnet design, where a pole of an electric motor is created using two rare earth magnets. The 'poles' for the two magnets are inclined in opposite directions with respect to each other, thereby creating a V configuration. However, the designs for inner rotors utilising a V magnet configuration are unsuitable for electric motors having an outer rotor, which will typically have a rotor that has insufficient radial space to use a one-piece rotor iron component for housing the angularly offset rare earth magnets used within inner rotor designs. Further, flux leakage can be relatively high for these designs.

It is desirable to improve this situation.

In accordance with an aspect of the present invention there is provided a rotor and method according to the accompanying claims.

This has the advantage of allowing a V magnet design to be incorporated within an electric motor having an outer rotor configuration having a reduced radial space and consequently a reduced diameter. Additionally, flux leakage between all rotor drive magnets can be minimised, thereby improving magnet utilisation.

The present invention will now be described, by way of example, with reference to the accompanying drawings, in which:

FIG. 3 illustrates a rotor according to an embodiment of the present invention;

Figure 1:
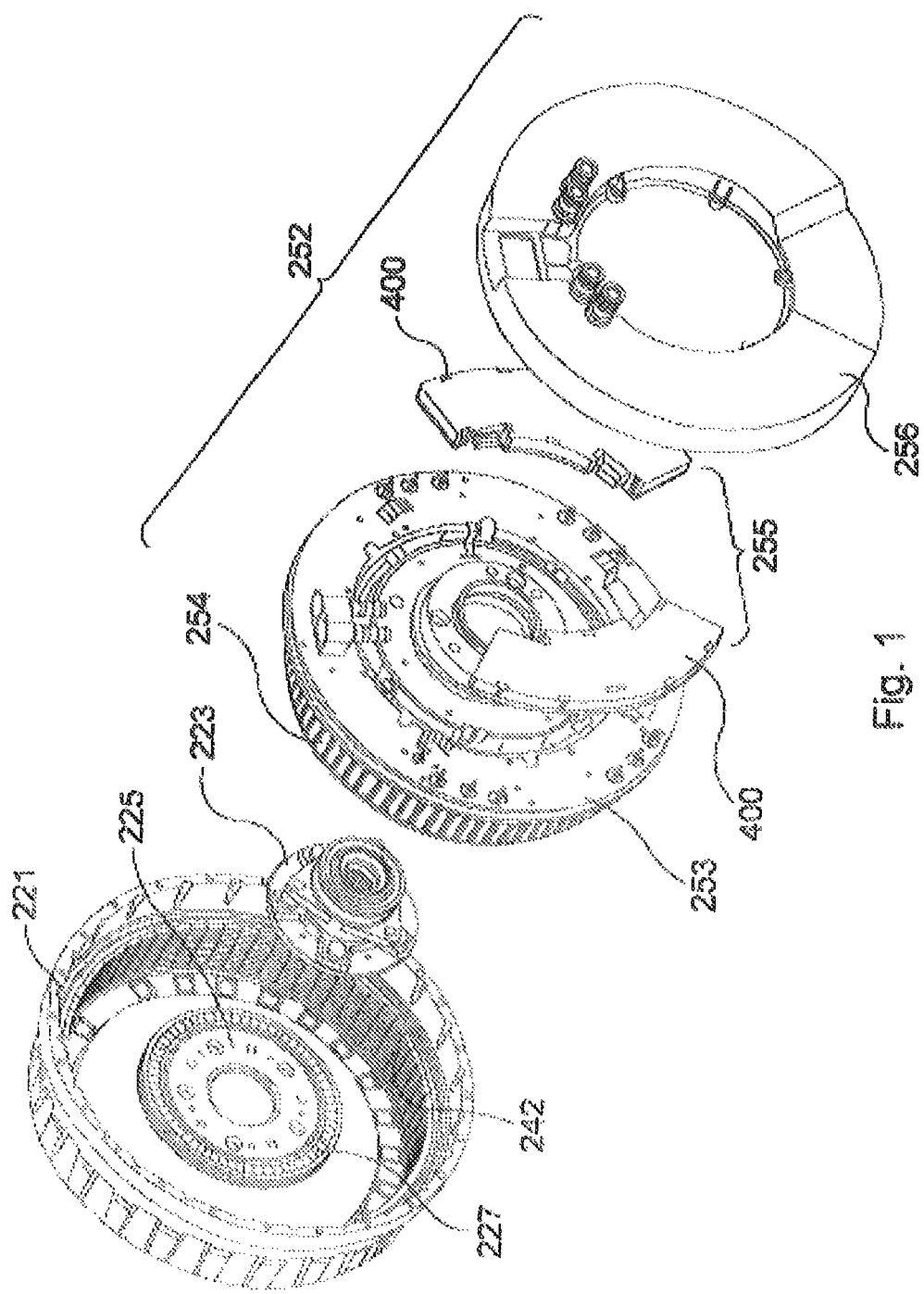
FIG. 1 illustrates an exploded view of a motor embodying the present invention.
Figure 2:
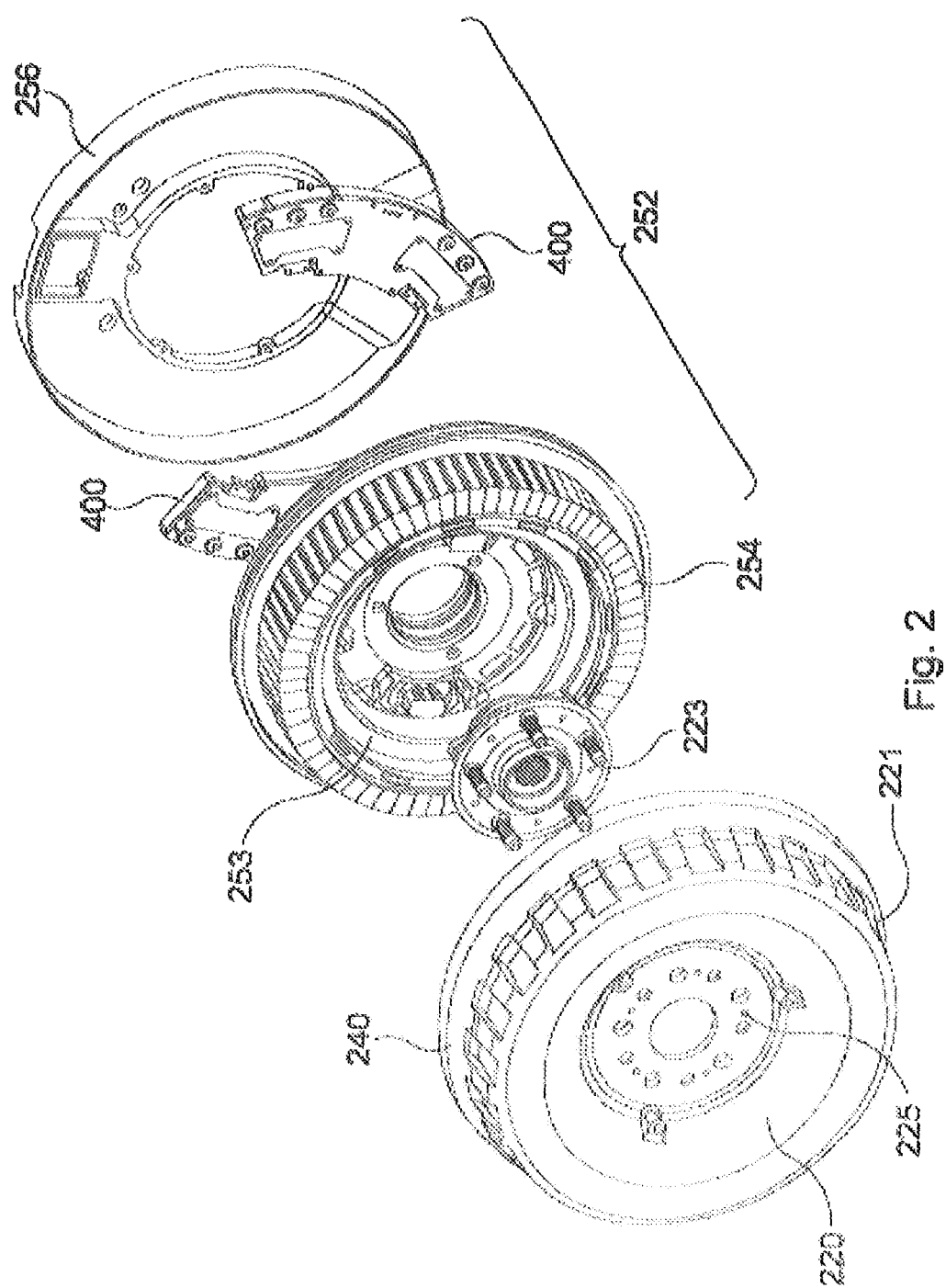
FIG. 2 is an exploded view of the motor of FIG. 1 from an alternative angle.

FIG. 1 and FIG. 2 illustrates an electric motor assembly incorporating an electric motor having a rotor according to the present invention where the electric motor assembly includes built in electronics and is configured for use as a hub motor or in-wheel electric motor built to accommodate a wheel. However, the present invention can be incorporated in any form of electric motor. The electric motor can also be configured as a generator.

FIG. 2 shows an exploded view of the same assembly as FIG. 1 from the opposite side.

For the purposes of the present embodiment, as illustrated in FIG. 1 and FIG. 2, the in-wheel electric motor includes a stator 252 and a rotor 240. The stator 252 preferably includes a main stator chassis 253 that incorporates a heat sink, multiple coils 254 and an electronics module 255 mounted in a rear portion of the main stator chassis 253 for driving the coils. The coils 254 are formed on stator tooth laminations to form coil windings. The stator teeth may be manufactured as part of the main stator chassis 253 or as separate elements that are mountable to the stator chassis 253. A stator cover 256 is mounted on the rear portion of the main stator chassis 253, enclosing the electronics module 255 to form the stator 252, which may then be fixed to a vehicle and does not rotate relative to the vehicle during use. However, other forms of the stator may be used; for example, the electronics module 255 may be located remote to the stator.

For the purposes of the present embodiment, the electronics module 255 includes two control devices 400, where each control device 400 typically includes an inverter and control logic.

A rotor 240 comprises a front portion 220, in other words a radial portion, and a cylindrical portion 221, in other words a rotor rim. The radial portion 220 is arranged to be rotatably mounted to the stator using a bearing block, as described below. The cylindrical portion 221 of the rotor is arranged to axially extend over the stator teeth when the rotor is rotatably mounted to the stator, thereby substantially surrounding the stator 252. The rotor includes a plurality of permanent magnets 242 arranged within the rotor rim 221 in a V shape configuration, where a pair of magnets that form a V shape correspond to an electric motor pole. To maximise flux density each pair of magnets that form a V shape are preferably mounted between soft ferromagnetic material, for example ferrous material or electrical steel, within the rotor rim 221, as described below. As is well known to a person skilled in the art, soft ferromagnetic material has a high permeability, thereby allowing it to support the formation of a magnetic field within it.

The soft ferromagnetic material may take any form, for example steel laminations or soft magnetic composite. The soft ferromagnetic material mounted on the rotor magnets, and which is adjacent to the stator teeth when the rotor is mounted to the stator, corresponds to the inner surface of the rotor rim 221, where the air gap between the inner surface of the rotor rim 221 and the end portion of the stator teeth is preferably kept to a minimum. As is well known to a person skilled in the art, with the soft ferromagnetic material having a high permeability the distance of the magnets to the inner surface of the rotor rim 221 is less significant.

Each pole of the electric motor corresponds to two magnets 30 configured in a V shape. Each of the two magnets that form an electric motor pole is angled such that they are substantially non-perpendicular to an end surface of a stator tooth 31 over which the magnet pair is located when the rotor is mounted to the stator when viewed from an axial cross-section, with each magnet 30 being oriented in an opposite direction, as illustrated in FIG. 3. Accordingly, a surface of a pole of one of the magnet pairs 30 that form the V shape magnet configuration is oriented towards the stator/centre of the rotor but is substantially non perpendicular to a line from the centre of the rotor to the magnet. Similarly, the surface of the same pole for the second magnet 30 is oriented towards the stator/centre of the rotor but is substantially non perpendicular to a line from the centre of the rotor to the magnet. However, the angle that the first and second magnets 30 are orientated relative to the line to the centre of the rotor is in opposite directions, thereby forming a V shape configuration.

As also illustrated in FIG. 3, each adjacent pole of the electric motor has an opposite polarity to the next, where the electric motor pole in the centre of FIG. 3 has a north polarity with both adjacent electric motor poles having a south polarity.

Although the electric motor may include any number of poles, for the purposes of the present embodiment, for a rotor having a diameter of 16 inches preferably the rotor includes 60 poles, that is to say, 60 V shape magnet pairs. However, any number of magnet pairs may be used.

As stated above, when the rotor is mounted to the stator the inner surface of the rotor rim 221 is arranged to be in close proximity to the coil windings on the stator 252 so that magnetic fields generated by the coils interact with the magnet pairs, which form the respective electric motor poles, arranged around the inside of the cylindrical portion 221 of the rotor 240 to cause the rotor 240 to rotate. To ensure that the rotor can rotate around the stator without interference from the stator an air gap exists between the top surface of the laminated stator tooth 401 and the inner surface of the rotor rim 221. A typical air gap would be in the region of 1.0 mm. As the permanent magnets 242 are utilized to generate a drive torque for driving the electric motor, the permanent magnets are typically called drive magnets.

The rotor 240 is attached to the stator 252 by a bearing block 223. The bearing block 223 can be a standard bearing block as would be used in a vehicle to which this motor assembly is to be fitted. The bearing block comprises two parts, a first part fixed to the stator and a second part fixed to the rotor. The bearing block is fixed to a central portion 253 of the wall of the stator 252 and also to a central portion 225 of the housing wall 220 of the rotor 240. The rotor 240 is thus rotationally fixed to the vehicle with which it is to be used via the bearing block 223 at the central portion 225 of the rotor 240. This has an advantage in that a wheel rim and tyre can then be fixed to the rotor 240 at the central portion 225 using the normal wheel bolts to fix the wheel rim to the central portion of the rotor and consequently firmly onto the rotatable side of the bearing block 223. The wheel bolts may be fitted through the central portion 225 of the rotor through into the bearing block itself. With both the rotor 240 and the wheel being mounted to the bearing block 223 there is a one to one correspondence between the angle of rotation of the rotor and the wheel.

The tilting stiffness of the bearing is preferably selected to be above a predetermined stiffness based on specified design criteria. For example, by having a bearing with a tilting stiffness above 5500 Nm/deg this will minimise the risk of the touchdown surfaces coming into contact during vehicle cornering manoeuvres up to 1 g lateral acceleration that impart a lateral force on the rotor.

The rotor housing also includes a focusing ring and magnets 227 for position sensing. A V shaped seal is provided between the circumferential wall 221 of the rotor and the outer edge of the stator housing.

Typically, to reduce weight while retaining structural strength the rotor housing and the main stator chassis 253 are made from an aluminium alloy.

To maximize magnet utilization it is desirable that flux leakage (e.g. flux short circuit paths) within the rotor design be minimized, thereby increasing the magnet coupling between the magnetic field created by the stator teeth coil windings and the rotor drive magnets 30.

To allow the rotor drive magnets 30 to be mounted to the rotor with minimum flux short circuit paths each rotor drive magnet 30 is mounted to the aluminium portion of the rotor rim 221 via a first soft ferromagnetic material element 32 that is shaped to allow the respective rotor drive magnets 30 to be mounted in a V shaped configuration when mounted on the rotor. The first soft ferromagnetic material element 32 may be a single element upon which are mounted all the rotor drive magnets 30 or a plurality of elements upon which a respective subset of the rotor drive magnets 30 are mounted on to each of the elements.

Once the respective rotor drive magnets 30 have been mounted to the first soft ferromagnetic material element 32 a plurality of second soft ferromagnetic material elements 33 are mounted to the rotor drive magnets 30 to form the inner rotor rim surface. To avoid flux short circuiting occurring, an air gap 34 exists between the respective end portions of the plurality of second soft ferromagnetic material elements when mounted in the rotor rim 221, as illustrated in FIG. 3. Mounting the rotor drive magnets 30 between multiple soft ferromagnetic material elements allows direct iron links between both poles of the individual magnets to be eliminated, thereby reducing routes through which flux short circuit paths are able to flow, thus increasing magnet utilisation.

In a first embodiment, the first soft ferromagnetic material element 32, which as stated above may take any form, for example electrical steel laminates or soft magnetic composite, is a substantially circumferential element. The cylindrical element may be a single solid element or a segmented design made up of two or more interlocking elements.

The outer surface 35 of the first soft ferromagnetic material element 32 preferably has a complementary surface to the inner surface of the rim of the aluminium rotor housing.

The outer surface 35 of the first soft ferromagnetic material element 32 is arranged to be mounted to the inner surface of the rim of the aluminium rotor housing.

Any suitable means for mounting the first soft ferromagnetic material element 32 to the rotor housing may be used, for example using an adhesive, or using a hot drop process where a temperature differential between the rotor housing and first soft ferromagnetic material element 32 is used to allow a first soft ferromagnetic material element 32 having an outer diameter that is larger than the inner diameter of the rotor housing to be fit within the rotor housing such that upon removal of the temperature differential an interference fit exists between the first soft ferromagnetic material element 32 and the rotor housing, or any form of keying formed on the interface between the outer surface of the first soft ferromagnetic material element 32 and the inner surface of the rotor housing rim.

Alternatively the first soft ferromagnetic material element 32 may act as the rotor housing without the need for a separate aluminium section.

The inner surface 36 of the first soft ferromagnetic material element 32 is arranged to have an undulating surface that forms a repeating tooth pattern. Adjacent surfaces on the inner surface 36 of the first soft ferromagnetic material element 32, which are inclined in opposite directions but are facing each other, are arranged to have a respective rotor drive magnet 30 mounted on them. The surface of the respective magnets 30 (i.e. magnet pairs) mounted on the oppositely inclined surfaces have the same magnetic polarity to form an electric motor pole.

Correspondingly, the surfaces of the respective magnets pairs facing away from the first soft ferromagnetic material element 32 have the same magnetic polarity as each other, but opposite to the magnet surfaces mounted on the first soft ferromagnetic material element 32.

The respective electric motor poles, made up with angularly offset magnet pairs as described above, are arranged such that adjacent electric motor poles have opposite magnetic polarity, as is well known to a person skilled in the art. By way of illustration, the magnetic polarity of the respective magnets forming three adjacent electric motor poles is illustrated in FIG. 3, which as stated above corresponds to a south, north, south arrangement.

The rotor drive magnets may be mounted to the first soft ferromagnetic material element 32 using any suitable means, for example via the use of an adhesive.

Mounted on each of the inner surfaces 37 of the rotor drive magnet pairs 30, which form an electric motor pole, is a second soft ferromagnetic material element 33. As with the first soft ferromagnetic material element 32, the second soft ferromagnetic material elements 33 may take any form, for example electrical steel laminates or soft magnetic composite.

To minimise flux leakage/flux loops, preferably a separate second soft ferromagnetic material element 33 is mounted to the inner surface 37 of respective rotor drive magnet pairs 30 that form an adjacent electric motor pole, as illustrated in FIG. 3, where no direct iron link exists between the respective second soft ferromagnetic material elements 33 or between the respective second soft ferromagnetic material elements 33 and the first soft ferromagnetic material element 32.

As illustrated in FIG. 3, each second soft ferromagnetic material element 33 is wedge shaped, where one surface is mounted to the inner surface 37 of one rotor drive magnet 30 and another surface is mounted to the inner surface 37 of another rotor drive magnet 30 inclined in the opposite direction to the first rotor drive magnet 30. The third surface of each of the second soft ferromagnetic material elements 33 forms the inner surface 38 of the rotor rim 221 and is substantially perpendicular to the line from the centre of the rotor to the second soft ferromagnetic material element 33, where an air gap 34 exists between the end portions/edges of the respective second soft ferromagnetic material elements 33.

In other words, the inner surface of the plurality of second soft ferromagnetic material elements forms a circumferential inner surface of the cylindrical portion, wherein a gap exists between the circumferential end regions of the respective plurality of second soft ferromagnetic material elements.

Although the present embodiment describes the use of an air gap between the end portions/edges of the respective second soft ferromagnetic material elements 33, any low permeability material may be inserted in the gap.

The second soft ferromagnetic material elements 33 may be mounted to the rotor drive magnets 30 using any suitable means, for example via the use of an adhesive.

As no direct iron link exists between the respective second soft ferromagnetic material elements 33 or between the respective second soft ferromagnetic material elements 33 and the first soft ferromagnetic material element 32 this minimises the possibility of flux leakage paths forming at the end portions of any of the rotor drive magnets 30.

In a second embodiment the first soft ferromagnetic material element 32 comprises a plurality of soft ferromagnetic material elements arranged to have two magnets 30 mounted on a respective inner surface 36.

In a preferred embodiment, each first soft ferromagnetic material element 32 is substantially wedge shaped, where one surface is mounted to the inner surface of the rotor rim housing. When the respective first soft ferromagnetic material elements 32 are mounted to the inner surface of the rotor rim housing two other surfaces of the respective wedge shaped soft ferromagnetic material elements form a repeating tooth pattern similar to that described in the first embodiment. As with the first embodiment, surfaces 36 on adjacent first soft ferromagnetic material elements 32 that are inclined in opposite directions but are facing each other, are arranged to have a respective rotor drive magnet 30 mounted on them. The surface of the respective magnets 30 (i.e. magnet pairs) mounted on the oppositely inclined surfaces have the same magnetic polarity to form an electric motor pole.

Accordingly, each first soft ferromagnetic material element 32 has two magnets 30 mounted on a respective surface; however each magnet 30 is part of a different electric motor pole and consequently has a different magnetic polarity.

The respective electric motor poles, made up with angularly offset magnet pairs as described above, are arranged such that adjacent electric motor poles have opposite magnetic polarity, as is well known to a person skilled in the art.

The rotor drive magnets may be mounted to the first soft ferromagnetic material elements 32 using any suitable means, for example via the use of an adhesive.

Mounted on each of the inner surfaces 37 of the rotor drive magnets 30, which form an electric motor pole, is a second soft ferromagnetic material element 33. As with the first soft ferromagnetic material element 32, the second soft ferromagnetic material elements 33 may take any form, for example electrical steel laminates or soft magnetic composite.

To minimise flux leakage/flux loops, preferably a separate second soft ferromagnetic material element 33 is mounted to the inner surface 37 of the respective rotor drive magnet pairs that form an electric motor pole, where no direct iron link exists between the respective second soft ferromagnetic material elements 33 or between the respective second soft ferromagnetic material elements 33 and the first soft ferromagnetic material element 32.

Each second soft ferromagnetic material element 33 is substantially wedge shaped, where one surface is mounted to the inner surface 37 of one rotor drive magnet 30 and another surface is mounted to the inner surface 37 of another rotor drive magnet 30 inclined in the opposite direction to the first rotor drive magnet 30. The third surface of each of the second soft ferromagnetic material elements 33 forms the inner surface 38 of the rotor rim 221 and is substantially perpendicular to the line from the centre of the rotor, where an air gap 34 exists between the end portions/edges of the respective second soft ferromagnetic material elements 33. Although the present embodiment describes the use of an air gap 34 between the end portions/edges of the respective second soft ferromagnetic material elements 33, any low permeability material may be inserted in the gap.

The second soft ferromagnetic material elements 33 may be mounted to the rotor drive magnets 30 using any suitable means, for example via the use of an adhesive.

As no direct iron link exists between the respective second soft ferromagnetic material elements 33 or between the respective second soft ferromagnetic material elements 33 and the first soft ferromagnetic material elements 32 this minimises the possibility of flux leakage paths forming on either end of any of the rotor drive magnets 30.

Figure 4:
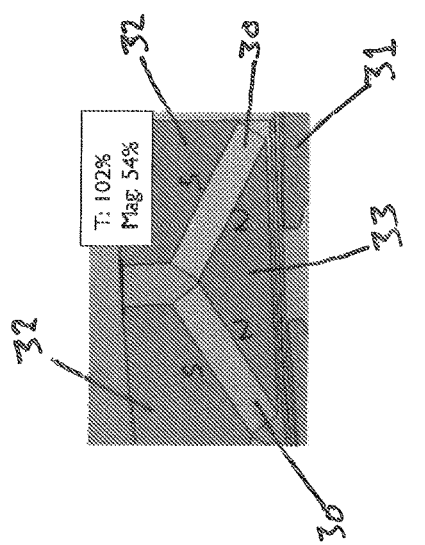
FIG. 4 illustrates a rotor according to an embodiment of the present invention.

FIG. 4 illustrates an example of a first rotor V drive magnet configuration according to the second embodiment in which a section of the rotor rim 221 corresponding to a single electric motor pole is illustrated. That is to say, two rotor magnets 30 configured in a V shape configuration.

The illustrated section of the rotor rim 221 includes two first soft ferromagnetic material elements 32 mounted to a rotor rim housing. A rotor drive magnet 30 is mounted to a respective surface 36 on the two first soft ferromagnetic material elements 32 such that the drive magnets 30 are angled such that they are substantially non perpendicular to an end surface of a stator tooth 31, with each magnet 30 being oriented in an opposite direction. The poles of each of the magnets facing towards the end surface of the stator tooth are the same.

Mounted between the two rotor drive magnets 30 is a second soft ferromagnetic material element 33 that is arranged to only extend up to the edges of the respective rotor drive magnets, thereby ensuring that an air gap 34 exists between the second soft ferromagnetic material element 33, the first soft ferromagnetic material element 32 and the rotor rim housing to avoid a flux leakage path being created between the first soft ferromagnetic material elements 32 and the second soft ferromagnetic material element 33.

In this embodiment, the inner surface 37 edges of the rotor drive magnets 30 are arranged to be in contact. In contrast, FIG. 5 illustrates another embodiment that has a similar configuration to that illustrated in FIG. 4 other than the edges of the inner surface edges are separated.

Figure 6:
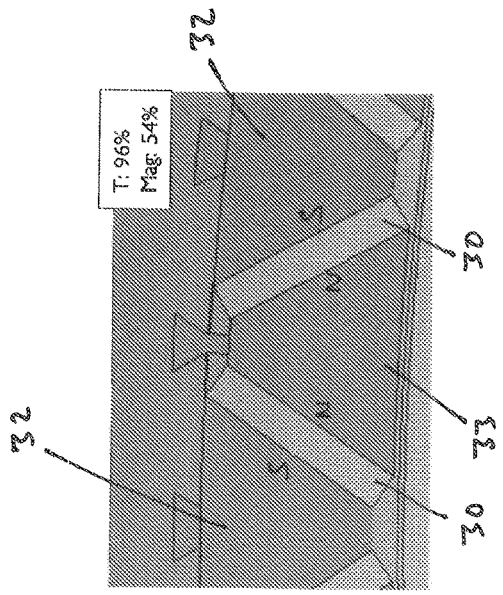
FIG. 6 illustrates a rotor according to an embodiment of the present invention.
Figure 5:
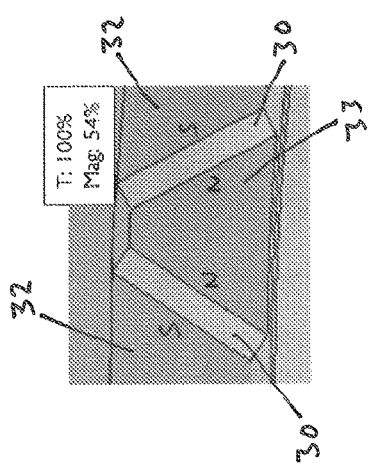
FIG. 5 illustrates a rotor according to an embodiment of the present invention.

FIG. 6 illustrates another embodiment that has a similar configuration to that illustrated in FIG. 5 other than an interlocking arrangement is used to mount the first soft ferromagnetic material elements 32 and the second soft ferromagnetic material element 33 to the rotor rim housing.

As stated above, any suitable means for mounting the first soft ferromagnetic material elements 32, second soft ferromagnetic material elements 33 and magnet 30 configuration to the rotor rim 221 may be used. However a preferred method would be to first place the inner surface of the plurality of second soft ferromagnetic material elements 33 onto a substantially circumferential support, where the circumferential support includes means for generating a magnetic field. Once the second soft ferromagnetic material elements 33 have been placed on the support a magnetic field is created to allow the plurality of second soft ferromagnetic material elements 33 to be retained to the circumferential support.

A magnet 30 is then placed on the respective outer surfaces of the respective second soft ferromagnetic material elements 33 such that a surface of a pole of the respective magnets 30 is oriented substantially non-perpendicular to the line from the centre of the circumferential support and the respective soft ferromagnetic material elements.

The first circumferential soft ferromagnetic material element 32 is placed over the plurality of magnets 30 such that a surface of the first soft ferromagnetic material element 32 is in contact with the opposite poles of the respective magnets 30 to that in contact with the respective first side of the plurality of soft ferromagnetic material elements 33. The circumferential portion of the rotor rim 221 is then placed over the first soft ferromagnetic material element 32.

Alternatively, the first circumferential soft ferromagnetic material element 32 may be replaced with a plurality of first soft ferromagnetic material elements, as described in the second embodiment.

Although the present embodiments describe the use of two drive magnets 30 configured in a V shape arrangement, alternatively the two drive magnets 30 can be replaced with a single C shaped magnet.

Although the V shape magnet configuration may result in an increase in magnet length, for the same motor torque requirements the width of the magnets can be reduced considerably, which results in a significant reduction in magnet mass. For example, for the magnet configurations illustrated in FIG. 4, FIG. 5 and FIG. 6, only 54 percent magnet mass is required compared to a conventional surface mounted magnet arrangement.

Additionally, a V shaped magnet configuration has been shown to provide better demagnetisation resistivity.

The invention claimed is:

1. A rotor for an electric motor or generator, the rotor comprising a radial portion, a cylindrical portion forming a housing, a first soft ferromagnetic material element, and a second soft ferromagnetic material element, wherein the radial portion is arranged to be rotatably mounted to a stator and the cylindrical portion is arranged to axially extend over radial teeth formed on the stator when the rotor is rotatably mounted to the stator, and a first surface of the first soft ferromagnetic material element is arranged to have mounted on it a first magnet such that a surface of a pole of the first magnet is oriented substantially non perpendicular to a line from the centre of the rotor to the first magnet, wherein a first surface of the second soft ferromagnetic material element is arranged to be mounted to the first magnet such that the first magnet is sandwiched between the first soft ferromagnetic material element and the second soft ferromagnetic material element, wherein a second surface of the second soft ferromagnetic material element is arranged to be substantially perpendicular to the line from the centre of the rotor to the first magnet, wherein the first soft ferromagnetic material element comprises two soft ferromagnetic material sections, wherein a second surface of both soft ferromagnetic material sections is mounted to the housing and the first surface of both soft ferromagnetic material sections is arranged to have mounted on them a respective magnet such that a surface of a pole of both magnets is oriented substantially non-perpendicular to a line from the centre of the rotor to the respective magnets, wherein both magnets are inclined at substantially the same angle to the line from the centre of the rotor to the respective magnets but in opposite directions, wherein neither of the two sections of the first soft ferromagnetic material element are in direct contact with each other, and wherein the second soft ferromagnetic material is not in contact with the housing.

2. A rotor according to claim 1, wherein the second surface of the first soft ferromagnetic material element is mounted to an inner surface of the housing.

3. A rotor according to claim 1, wherein the first surface of the second soft ferromagnetic material element is mounted to one of the respective magnets, the second soft ferromagnetic material element further comprising a third surface that is arranged to be mounted to the second of the respective magnets such that the second magnet is sandwiched between the second soft ferromagnetic material element and the soft ferromagnetic material section that the second magnet is mounted to.

4. A rotor according to claim 1, wherein a third surface of the first soft ferromagnetic material element is arranged to have mounted on it a second magnet such that a surface of a pole of the second magnet is oriented substantially non perpendicular to a line from the centre of the rotor to the second magnet, wherein a third surface of the second soft ferromagnetic material element is arranged to be mounted to the second magnet such that the second magnet is sandwiched between the first soft ferromagnetic material element and the second soft ferromagnetic material element, wherein the second magnet is inclined at substantially the same angle to the line from the centre of the rotor to the second magnet as the first magnet is inclined to the line from the centre of the rotor to the first magnet but in an opposite direction.

5. A rotor according to claim 1, wherein the first magnet and the second magnet correspond to a pole of the electric motor.

6. A rotor according to claim 1, wherein the first magnet and the second magnet are not in direct contact.

7. A rotor according to claim 1, further comprising a plurality of second soft ferromagnetic material elements mounted to a respective magnet pair, wherein none of the plurality of second soft ferromagnetic material elements are in direct contact with each other.

8. A rotor according to claim 1, further comprising a plurality of second soft ferromagnetic material elements mounted to a respective magnet pair, wherein an inner surface of the plurality of second soft ferromagnetic material elements forms a circumferential inner surface of the cylindrical portion, wherein a gap exists between the circumferential end regions of the respective plurality of second soft ferromagnetic material elements.

9. A rotor according to claim 8, wherein the gap is an air gap.

10. A rotor according to claim 8, wherein a low permeability material is placed in the gap.

11. A rotor according to claim 1, wherein the first magnet is mounted to the first surface of the first soft ferromagnetic material element with an adhesive.

12. A rotor according to claim 1, wherein one or both of the first soft ferromagnetic material element or the second soft ferromagnetic material element is constructed using soft ferromagnetic material laminations or soft magnetic composite material.

* * * * *